March 17, 1964 J. H. FENNICK ETAL 3,125,692

STEPPING SWITCH CIRCUIT

Filed Nov. 20, 1961 2 Sheets-Sheet 1

INVENTORS: J. H. FENNICK
R. A. KAENEL

BY Lucian C. Canepa

ATTORNEY

March 17, 1964 J. H. FENNICK ETAL 3,125,692

STEPPING SWITCH CIRCUIT

Filed Nov. 20, 1961 2 Sheets-Sheet 2

INVENTORS: J. H. FENNICK
R. A. KAENEL
BY Lucian C. Canepa
ATTORNEY

United States Patent Office 3,125,692
Patented Mar. 17, 1964

3,125,692
STEPPING SWITCH CIRCUIT

John H. Fennick, Plainfield, and Reginald A. Kaenel, Murray Hill, N.J., assignors to Bell Telephone Laboratories, Incorporated, New York, N.Y., a corporation of New York Filed Nov. 20, 1961, Ser. No. 153,363
6 Claims. (Cl. 307—88.5)

Figure 1:
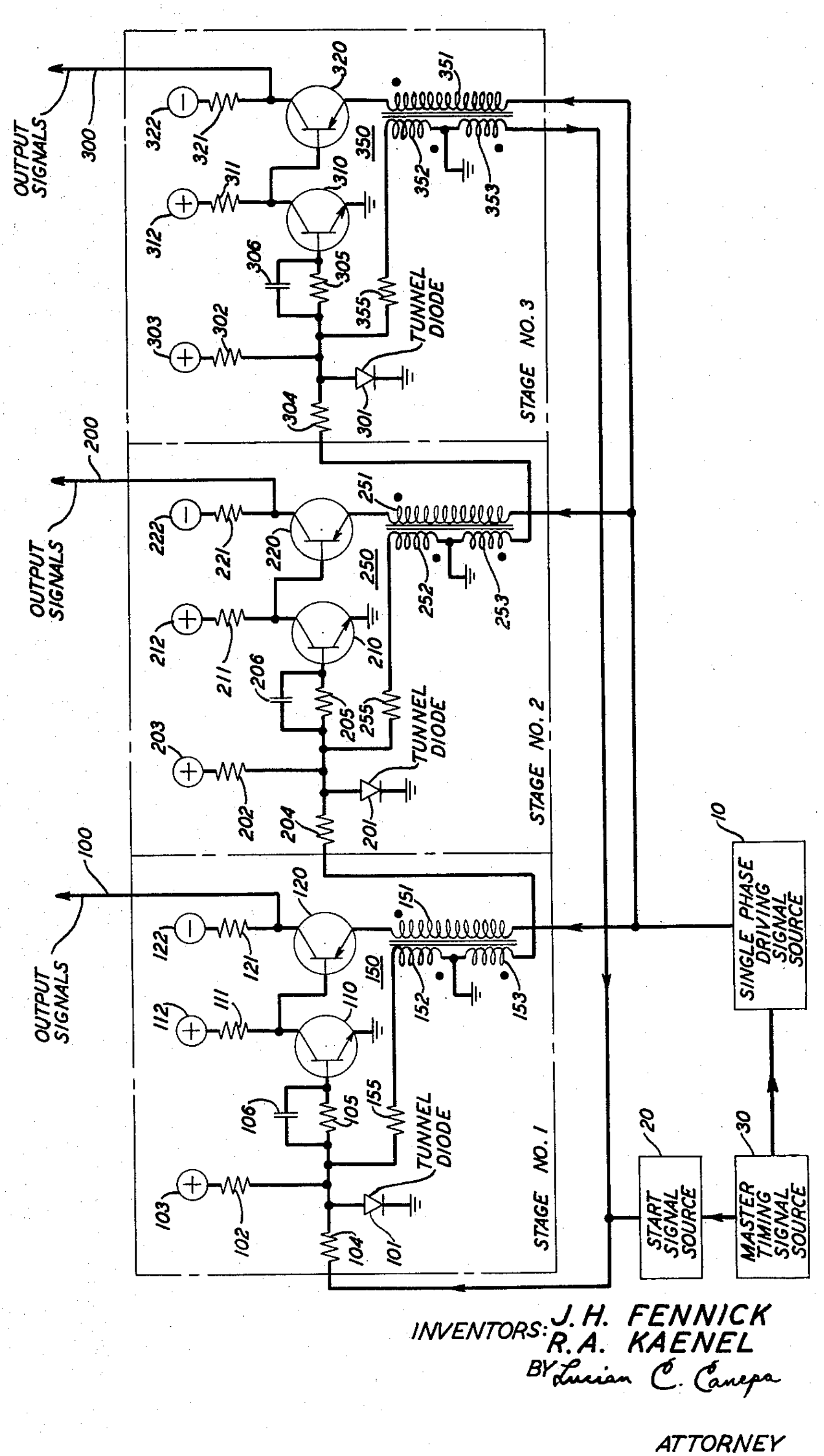

This invention relates to signal processing circuits, and more particularly to a stepping switch circuit.

Stepping switch circuits are useful in information processing systems as timing signal sources to sequentially control the operation of the systems. A typical such circuit requires for its operation a multiphase driving signal source and, in addition, a reset signal source for returning the circuit to its initial condition. The necessity for including such sources in a stepping switch circuit contributes significantly to the complexity of the circuit and, as a result, may adversely affect the cost, reliability and overall performance characteristics thereof.

An object of the present invention is the improvement of signal processing circuits, particularly stepping switch circuits.

Another object of this invention is the provision of stepping switch circuits which are characterized by simplicity of design and high reliability.

A further object of the present invention is the provision of a stepping switch circuit which operates reliably from a very low power, single phase driving signal source.

Still another object of this invention is the provision of a stepping switch circuit in which the driving power required from the single phase source thereof is independent of the number of stages included in the circuit.

Yet another object of the present invention is the provision of a stepping switch circuit in which each stage thereof is returned in sequence to its initial condition by a self-resetting action.

These and other objects of the present invention are realized in a specific illustrative stepping switch circuit embodiment that includes a plurality of stages each of which comprises a first switching transistor having an output path and, in addition, a bistable-biased voltage-controlled negative resistance diode and a second switching transistor for controlling the condition of the first transistor. Each stage also includes a differentiating transformer one end of whose primary winding is connected to the first switching transistor, the other end of the primary winding being connected to the output of a single phase driving signal source. Each transformer further includes two secondary windings, one secondary winding being connected to the diode of the stage that includes the transformer and the other secondary winding being connected to the diode of the next following stage of the circuit.

The application of a signal from a start source to the diode in the first stage of the illustrative stepping switch circuit initiates a cycle of operation in which signals appear in sequence on the output paths of the first switching transistors. The start signal switches the diode in the first stage to its relatively high voltage state, thereby enabling or priming the first switching transistor of that stage and permitting the next pulse from the driving source to appear on the output path of the first stage. The secondary windings of the differentiating transformer of the first stage derive pulses from the trailing edge of this driving signal to reset the diode of the first stage to its relatively low voltage state and to set the diode of the next following stage to its relatively high voltage state, thereby priming the next stage to undergo an output switching cycle in response to the next driving signal from the single phase source. In turn, the second stage responds to the next driving signal by furnishing an output signal, resetting itself and priming the third stage. The other stages operate similarly.

It is a feature of the present invention that a stepping switch circuit include a plurality of stages each of which comprises a switching transistor and a bistable-biased voltage-controlled negative resistance diode for controlling the condition of the transistor, and that the circuit further include a single phase driving signal source connected to the switching transistors for energizing them in sequence.

It is another feature of this invention that a stepping switch circuit include a plurality of stages each of which comprises a differentiating transformer whose primary winding is connected to the output of a single phase driving signal source.

It is still another feature of the present invention that a stepping switch circuit include a plurality of stages each of which comprises a differentiating transformer having a primary winding and two secondary windings, each primary winding being connected to the output of a single phase driving signal source, whereby the voltage induced in one secondary winding of a primed stage in response to the trailing edge of a driving signal is effective to reset that state to its initial condition and the voltage induced in the other secondary winding of the primed stage in response to the trailing edge of the same driving signal is effective to set the next following stage to its primed condition.

Yet another feature of this invention is that each stage of an n-stage stepping switch circuit include a switching transistor and a bistable-biased voltage-controlled negative resistance diode for controlling the condition of the transistor, that each stage further include a differentiating transformer having a primary winding connected to the switching transistor and, in addition, two secondary windings, one secondary winding being connected to the diode included in the stage and the other secondary winding being connected to the diode included in the next following stage, and that the circuit further include a single phase driving signal source connected to the primary winding of each stage.

Figure 2:
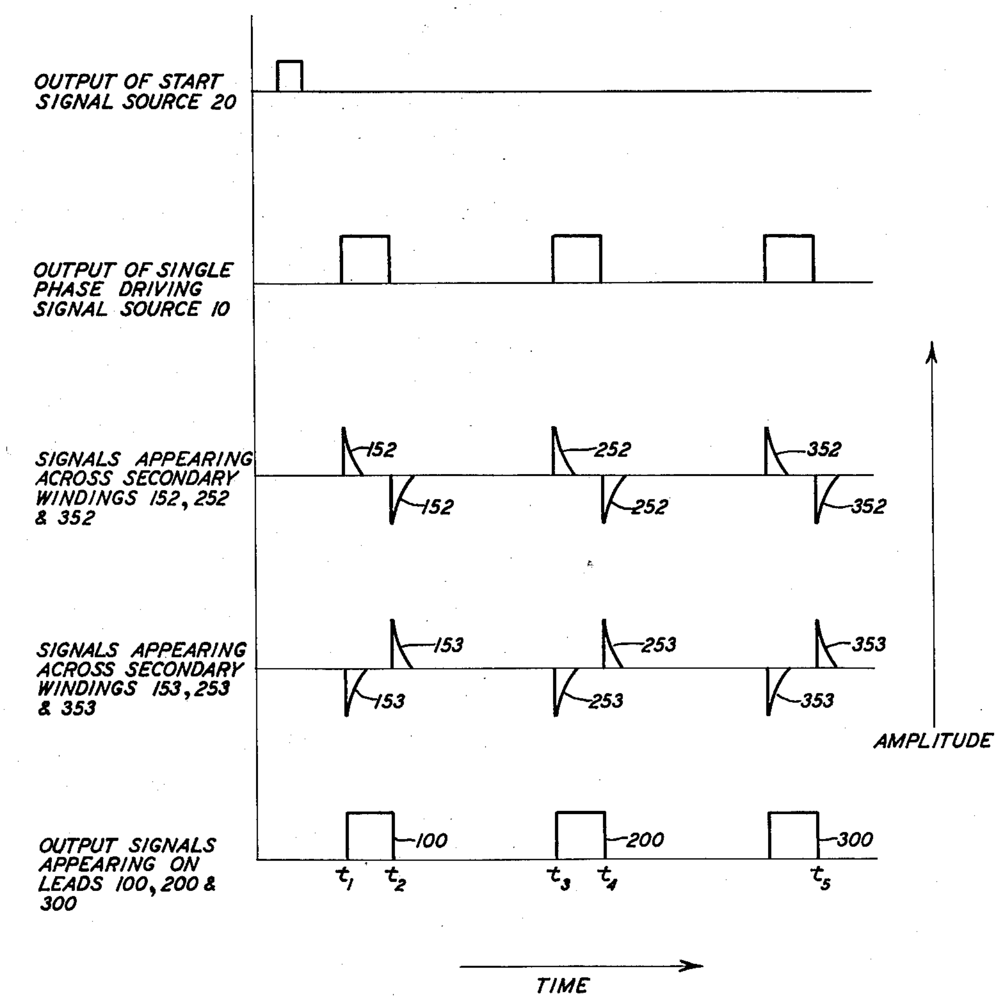

A complete understanding of the present invention and of the above and other features and advantages thereof may be gained from a consideration of the following detailed description of an illustrative embodiment thereof presented hereinbelow in connection with the accompanying drawing, in which:

FIG. 1 depicts an illustrative stepping switch circuit made in accordance with the principles of the present invention; and FIG. 2 illustrates various waveforms characteristic of the circuit shown in FIG. 1.

Illustrative embodiments of the principles of the present invention include negative resistance diodes of the voltage-controlled type. One highly advantageous example of this type of two-terminal negative resistance arrangement is the so-called tunnel diode. Tunnel diodes are described in the literature: see, for example, "New Phenomen in Narrow Germanium P-N Junctions," L. Esaki, Physical Review, volume 109, January–March 1958, pages 603–604; "Tunnel Diodes as High-Frequency Devices," H. S. Sommers, Jr., Proceedings of the Institute of Radio Engineers, volume 47, July 1959, pages 1201–1206; and "High-Frequency Negative-Resistance Circuit Principles for Esaki Diode Applications," M. E. Hines, The Bell System Technical Journal, volume 39, May 1960, pages 477–513.

Referring now to FIG. 1, there is shown in detail a specific three-stage stepping switch circuit which illustratively embodies the principles of the present invention. The stages are identical to each other and include leads 100, 200 and 300 on which output signals appear in sequence in response to the application to the stages of driving signals from a single phase source 10. The output signal waveforms of the source 10 are shown in the second row of FIG. 2, and the waveforms of the signals that appear on the output leads 100, 200 and 300 are represented in the bottom row of FIG. 2.

Stage No. 1 includes a voltage-controlled negative resistance diode 101, a second switching transistor 110 of the NPN type and a first switching transistor 120 of the PNP type. The diode 101 is biased for bistable operation by a resistor 102 and a positive source 103. Connected to the plate electrode of the diode 101 are an input resistor 104 and a coupling network comprising a resistor 105 and a capacitor 106, the network interconnecting the plate electrode of the diode 101 and the base of the second switching transistor 110. The collector of the transistor 110 is connected via a bias resistor 111 to a positive source 112. Also, the collector of the transistor 110 is directly connected to the base of the first switching transistor 120 whose collector is connected via a bias resistor 121 to a negative source 122.

The collector of the first switching transistor 120 of stage No. 1 is connected to the output lead 100, while the emitter thereof is connected via the primary winding 151 of a differentiating transformer 150 to the single phase driving signal source 10, the transformer 150 also including two oppositely-phased secondary windings 152 and 153. The secondary winding 152 is connected via an isolating resistor 155 to the plate electrode of the bistable-biased diode 101 in stage No. 1, and the other secondary winding 153 is connected via an input resistor 204 to the plate electrode of the voltage-controlled negative resistance diode 201 in stage No. 2. The differentiating transformers included in the illustrative embodiment may, for example, be of the type described in: "Low Power Pulse Transformers," Report R-122 by T. F. Wilmett, Servomechanisms Laboratory, Massachusetts Institute of Technology, 1947.

Assume that each of the diodes 101, 201, and 301 of the circuit depicted in FIG. 1 is initially biased at a relatively low voltage stable operating point on its voltage-current characteristic curve. The transistor 110 in stage No. 1 is biased by the relatively low voltage appearing across the diode 101 to a point of low current condition and the collector of the transistor 110 is maintained by the source 112 at a sufficiently high positive potential with respect to ground to keep the transistor 120 deenergized or closed even when positive signals from the source 10 are applied to the emitter thereof via the winding 151 of the differentiating transformer 150. In a similar manner, the relatively low voltages appearing across the diodes 201 and 301 prevent the output of the source 10 from being transferred to the output leads 200 and 300 of stages 2 and 3. With the transistors 120, 220 and 320 blocked or open circuited, no signals appear across the secondary windings of the differentiating transformers 150, 250 and 350.

Assume now that start source 20 applies, under control of a master timing source 30, a positive signal via the input resistor 104 to switch the bistable-biased diode 101 to its relatively high voltage stable operating point. This relatively high voltage biases the base of the second switching transistor 110 sufficiently positive with respect to the grounded emitter thereof to cause the transistor 110 to conduct, whereby its collector, and therefore also the base of the first switching transistor 120, assume a low potential only slightly more positive than ground. Accordingly, whenever under these conditions the source 10 is triggered by the master source 30 to apply a first signal to the emitter of the transistor 120 via the primary winding 151 of the differentiating transformer 150, this signal appears on the output lead 100 connected to the collector of the transistor 120.

In approximate time coincidence with the occurrence of the leading edge of the first output signal from the source 10, i.e., at about the time designated $t_1$ in FIG. 2, there appears across the secondary winding 152 of stage No. 1 a positive-going pulse which is applied via the resistor 155 to the diode 101. As specified above, the diode 101 is already in its relatively high voltage stable state. Hence the positive-going pulse does not switch the stable state of the diode 101. The noted positive-going pulse appearing across the secondary winding 152 at time $t_1$ is represented in the third row of FIG. 2 and is identified there by the reference numeral 152.

Similarly, in approximate time coincidence with the occurrence of the leading edge of the first output signal from the source 10, there appears across the oppositely-phased secondary winding 153 of stage No. 1 a negative-going pulse which is applied via the input resistor 204 to the diode 201 of stage No. 2. However, as specified above, the diode 201 is already in its relatively low voltage stable state. Thus the negative-going pulse does not switch the stable state of the diode 201. The noted negative-going pulse appearing across the secondary winding 153 at time $t_1$ is represented in the fourth row of FIG. 2 and is identified there by the reference numeral 153.

During the time interval designated $t_1$ through $t_2$ on the abscissa of FIG. 2, the first switching transistor 120 of stage No. 1 remains energized or unblocked, thereby permitting the output of the driving signal source 10 to be transferred to the output path 100. During the same interval, the transistors 220 and 320 in stages 2 and 3 are deenergized or blocked and, as a result, no signals appear on the output leads 200 and 300 associated therewith. It is characteristic of the illustrative embodiment shown in FIG. 1 that only one at a time of the stages thereof is energized. Accordingly, loading of the source 10 is independent of the number of stages driven thereby.

Subsequently, in approximate time coincidence with the occurrence of the trailing edge of the first output signal from the source 10, i.e., at about the time designated $t_2$ in FIG. 2, there appears across the secondary winding 152 of stage No. 1 a negative-going pulse which is applied via the resistor 155 to reset the diode 101 to its relatively low stable state, thereby, as described in detail above, deenergizing or blocking the transistor 120. This negative-going pulse appearing across the winding 152 at time $t_2$ is represented in the third row of FIG. 2 and is identified there by the reference numeral 152.

Also, at about the time designated $t_2$ in FIG. 2, there appears across the secondary winding 153 of stage No. 1 a positive-going pulse which is applied via the resistor 204 to set the diode 201 to its relatively high voltage stable state, thereby biasing the transistor 210 into its conducting state and, as a result thereof, energizing or unblocking the first switching transistor 220. Thus, during the time interval designated $t_2$ through $t_3$, and thereafter, stage No. 2 is primed to pass driving signals to its output lead 200, while stages 1 and 3 are deenergized or blocked to the passage of driving signals therethrough. Hence, when at time $t_3$ another driving signal is applied to the three stages from the source 10, this driving signal is transferred only to the output lead 200.

The positive- and negative-going pulses respectively appearing at time $t_3$ across the secondary windings 252 and 253 of the differentiating transformer 250 included in stage No. 2 do not switch the diodes 201 and 301 from their high and low voltage stable states, respectively. At time $t_4$, however, a negative-going pulse appears across the secondary winding 252 and is effective to reset the diode 201 to its relatively low voltage state. At that same time, a positive-going pulse appears across the secondary winding 253. This pulse is effective to set the diode in stage No. 3 to its relatively high voltage stable state, thereby priming stage No. 3 for the passage therethrough of the next output signal from the driving source 10.

Later, at about the time designated $t_5$ in FIG. 2, the diode 301 in stage No. 3 is automatically reset in a manner identical to that described above in connection with the operation of stages 1 and 2. Also, at time $t_5$, a positive-going pulse appears across the secondary winding 353 of the transformer 350 in stage No. 3 to switch the diode 101 of stage No. 1 to its relatively high voltage stable state, thereby initiating another complete cycle of operation of the specific illustrative stepping switch circuit shown in FIG. 1.

It is noted that detailed circuit configurations for the sources 10, 20 and 30 have not been presented herein, as the detailed structures of these units are considered, in view of the functional requirements therefor set forth hereinabove, to be clearly within the skill of the art.

Although only a three-stage stepping switch circuit has been described and depicted in FIG. 1, it is to be clearly understood that the principles of the present invention extends to an *n*-stage stepping switch circuit. Significantly, the driving power required from the source 10 remains constant regardless of the number of stages included in the circuit, because, as indicated above, only one stage at a time draws power from the single phase source 10.

Additionally, it is emphasized that although particular attention herein has been directed to the use of tunnel diodes as the voltage-controlled negative resistance elements of the circuit shown in FIG. 1, and the use of transistors as the switching devices thereof, other suitable arrangements having characteristics similar thereto may be substituted therefor.

Furthermore, it is to be understood that the above-described arrangements are only illustrative of the application of the principles of the present invention. Numerous other arrangements may be devised by those skilled in the art without departing from the spirit and scope of this invention.

What is claimed is:

1. In combination in a stepping switch circuit, a plurality of stages each including a switching device and a bistable element for controlling the condition of said device, each of said elements being characterized by set and reset conditions, each stage also including a differentiating transformer having a primary winding, a one-phase source for supplying driving signals each characterized by a trailing edge, said source being connected to the switching device of each stage via the primary winding of the differentiating transformer thereof, a start pulse source for setting the bistable element of the first stage to enable the switching device of said first stage, and means responsive to the appearance of the trailing edge of a driving pulse across the differentiating transformer of a stage whose bistable element is in a set condition for resetting the bistable element in said stage and for setting the bistable element of the next following stage.

2. In combination in a stepping switch circuit, *n* interconnected stages arranged in a linear array, where *n* is any positive integer greater than one, a single-phase source for supplying driving signals each characterized by a trailing edge, each stage comprising switching means including a switching transistor characterized by an energized and a deenergized state, each stage also including an output path connected to said switching transistor, each stage further including controlling means characterized by set and reset conditions for respectively energizing and deenergizing said switching transistor, said controlling means including a tunnel diode and means for biasing said diode for bistable operation, said controlling means further including an intermediate transistor responsive to the condition of said diode for controlling the state of said switching transistor, and means in each stage connected to said driving source and responsive to a particular switching transistor being in its energized state for coupling a driving signal to the output path connected to said particular switching transistor, said coupling means being responsive to the occurrence of the trailing edge of said driving signal for resetting the controlling means associated with said particular switching transistor and for setting the controlling means in the next following stage.

3. A combination as in claim 2 wherein said coupling means includes a differentiating transformer in each stage.

4. A combination as in claim 3 wherein each differentiating transformer includes a primary winding interconnecting said source and the associated switching transistor in the same stage.

5. A combination as in claim 4 wherein each differentiating transformer further includes two oppositely-phased secondary windings, one secondary winding being connected to the associated diode in the same stage and the other secondary winding being connected to the diode in the next following stage.

6. In combination, a switching device, a bistable element connected to said device for controlling the condition thereof, said element being characterized by set and reset conditions which respectively activate and deactivate said switching device, a differentiating transformer having primary and secondary windings, a one-phase source for supplying driving signals each characterized by a trailing edge, said source being connected to said switching device via said primary winding, means for placing said bistable element in its set condition, and means connecting said secondary winding to said bistable element for resetting said element so that whenever said bistable element is in its set condition, thereby activating said switching device, said resetting means responds to the trailing edge of a driving signal to reset said bistable element and thereby deactivate said switching device.

References Cited in the file of this patent

IBM Technical Disclosure Bulletin, vol. 3, No. 6, November 1960, "Switching Circuit," G. W. Neff, pages 46–47.